United States Patent
Kaushikkar et al.

(10) Patent No.: US 11,275,616 B2
(45) Date of Patent: Mar. 15, 2022

(54) RESOURCE ACCESS MANAGEMENT

(71) Applicant: Apple Inc., Cupertino, CA (US)

(72) Inventors: Harshavardhan Kaushikkar, San Jose, CA (US); Sridhar Kotha, San Jose, CA (US); Srinivasa Rangan Sridharan, San Jose, CA (US); Xiaoming Wang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/439,920

(22) Filed: Jun. 13, 2019

(65) Prior Publication Data

US 2020/0394070 A1 Dec. 17, 2020

(51) Int. Cl.
*G06F 9/46* (2006.01)
*G06F 9/50* (2006.01)
*G06F 12/0804* (2016.01)

(52) U.S. Cl.
CPC ........ *G06F 9/5011* (2013.01); *G06F 12/0804* (2013.01); *G06F 2209/503* (2013.01); *G06F 2212/1021* (2013.01)

(58) Field of Classification Search
CPC ............... G06F 9/5011; G06F 12/0804; G06F 2209/503; G06F 2212/1021
See application file for complete search history.

(56) References Cited

U.S. PATENT DOCUMENTS

| | | | |
|---|---|---|---|
| 6,009,275 A | 12/1999 | Dekoning et al. | |
| 6,823,472 B1 | 11/2004 | Dekoning et al. | |
| 6,892,259 B2 | 5/2005 | Goodrum et al. | |
| 7,953,860 B2 | 5/2011 | Colrain et al. | |
| 8,539,182 B2 | 9/2013 | Greenebaum | |
| 9,082,118 B2 | 7/2015 | Saund et al. | |
| 9,524,261 B2 | 12/2016 | Saund et al. | |
| 10,108,456 B2 | 10/2018 | Jain et al. | |
| 10,169,235 B2 | 1/2019 | Saha et al. | |
| 10,437,758 B1 | 10/2019 | Mathews et al. | |
| 10,762,435 B2* | 9/2020 | Yang | H04L 49/90 |
| 2014/0281197 A1* | 9/2014 | Niell | G06F 12/0831 711/105 |
| 2014/0330923 A1* | 11/2014 | Baptist | G06F 3/0619 709/213 |

(Continued)

*Primary Examiner* — Diem K Cao
(74) *Attorney, Agent, or Firm* — Kowert Hood Munyon Rankin and Goetzel PC; Rory D. Rankin

(57) ABSTRACT

A system and method for efficiently allocating resources of destinations to sources conveying requests to the destinations. In various embodiments, a computing system includes multiple sources that generate requests and multiple destinations that service the requests. One or more transaction tables store requests received from the multiple sources. Arbitration logic selects requests and stores them in a processing table. When the logic selects a given request from the processing table, and determines resources for the corresponding destination is unavailable, the logic removes the given request from the processing table and allocates the request in a retry handling queue. When the retry handling queue has no data storage for the request, logic updates a transaction table entry and maintains a count of such occurrences. When the count exceeds a threshold, the logic stalls requests for that source. Requests in the retry handling queue have priority over requests in the transaction tables.

20 Claims, 8 Drawing Sheets

(56) References Cited

U.S. PATENT DOCUMENTS

| | | | |
|---|---|---|---|
| 2015/0058526 A1* | 2/2015 | Venkata | G06F 3/0659 |
| | | | 711/103 |
| 2017/0168940 A1* | 6/2017 | Saha | G06F 12/084 |
| 2017/0207984 A1* | 7/2017 | Chokkalingam | G06F 9/5027 |
| 2018/0357291 A1* | 12/2018 | Choi | G06F 16/2379 |
| 2020/0045134 A1* | 2/2020 | Rozas | H04L 67/325 |
| 2020/0334078 A1* | 10/2020 | Baldocchi | G06F 9/5027 |

* cited by examiner

RESOURCE ACCESS MANAGEMENT

BACKGROUND

Technical Field

Embodiments described herein relate to the field of computing systems and, more particularly, to efficiently allocating resources of destinations to sources conveying requests to the destinations.

Description of the Related Art

Systems on chips (SoCs) are becoming increasingly complex with ever increasing numbers of agents within a typical SoC and available endpoints. The agents include one or more of multimedia engines, digital signal processors (DSPs) and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints.

Typically, an interconnect conveys transactions from a source, such as an agent, to a destination such as an endpoint. In some cases, the interconnect is a communication fabric and the endpoint is one of multiple available memory devices. One or more queues are included in the interconnect for providing intermediate storage for commands, messages, and data in transit between a source and a destination. The management of the intermediate storage and the number outstanding transactions for each of the multiple sources in the computing system becomes more complex as the number of sources targeting a particular destination, such as a memory device. If the destination is already busy with other activities, after some time, the source begins experiencing back pressure as the intermediate storage fills up, and a performance bottleneck is created.

In view of the above, efficient methods and mechanisms for efficiently allocating resources of destinations to sources conveying requests to the destinations are desired.

SUMMARY

Systems and methods for efficiently allocating resources of destinations to sources conveying requests to the destinations are contemplated. In various embodiments, a computing system includes multiple sources that generate requests and multiple destinations that service the requests. In an embodiment, the sources include agents such as multimedia engines, digital signal processors (DSPs) and processing units, each with one or more of a central processing unit (CPU) and a data parallel processor like a graphics processing unit (GPU). The destinations include endpoints such as input/output (I/O) peripheral devices such as memory devices, communication interfaces such as radio communication interfaces, speakers, displays and so on. In one embodiment, the destinations include system memory and a last-level cache for the sources. In some embodiments, the sources transfer transactions and data between one another and the destinations through a communication fabric (or fabric). Each agent and each endpoint is both a source and a destination for transactions depending on the direction of traffic flow through the fabric.

In some embodiments, the fabric includes one or more intermediate buffers for storing transactions and corresponding payload data during transport. In an embodiment, the computing system includes a resource manager with one or more intermediate buffers and tables, an interface to one or more memory devices of the system memory, the last-level cache and an interface to the multiple sources for retrieving data or verifying data storage for snoops. The "resource manager" is a version of a memory controller with these components although the system memory includes a separate memory controller in some designs.

In an embodiment, the resource manager includes one or more transaction tables for storing requests received from the multiple sources. In various designs, the requests are memory requests. As used herein, a "memory request" is also referred to as a "memory access operation," a "memory access transaction" or a "transaction,' or a "memory access request." In some designs, the resource manager includes one transaction table for each source. In other designs, a particular transaction table stores requests for two or more sources.

The resource manager includes arbitration logic for selecting requests from the one or more transaction tables and storing them in a processing table. In an embodiment, the processing table stores requests from multiple sources. Although a given request is selected and has corresponding information copied and stored in the processing table, the given request maintains its allocated table entry in the corresponding transaction table. In some designs, this table entry is not deallocated until the logic of the resource manager determines that the given request is processed such as being conveyed to the resources of a destination.

As described earlier, in some designs, the destinations include system memory and a last-level cache for the sources. Logic in the resource manager verifies whether target addresses of the requests stored in the processing table match at least a portion of addresses pointing to memory locations storing corresponding data in the last-level cache. For example, the logic of the resource manager includes a tag array storing a tag portion of addresses corresponding to data stored in the last-level cache. A match indicates a cache hit, whereas, no matches found indicates a cache miss. For cache hits, the destination of the corresponding request is the last-level cache. For cache misses, the destination of the corresponding request is system memory. Therefore, in some embodiments, the destination of the requests is not known until the logic selects and sends the requests from one of the transaction tables to the processing table.

When arbitration logic for the processing table selects a given request, and the logic of the resource manager determines resources, such as a queue, for the corresponding destination is available, the logic removes the given request from the processing table and sends the given request to the resources. As used herein, to "remove" the given request from data storage is also referred to as to "deallocate" the given request from the data storage. For example, a table entry, a queue entry, or other entry has a copy of information corresponding to the given request invalidated. At this point, the given request is considered processed, although not yet completed. However, in some embodiments, the logic of the resource manager removes the given request from its corresponding transaction table. When arbitration logic for the processing table selects the given request, and the logic of the resource manager determines resources for the corresponding destination is unavailable, the logic removes the given request from the processing table and allocates a queue entry in a separate queue such as a retry handling queue. In some designs, the queue entry is not allocated unless a subset of the queue entries dedicated to requests from the given source to the given destination has an available queue entry.

In some designs, one or more of the processing table, the retry handling queue, and the resources corresponding to destinations has a limited number of available entries less than the total number of entries available for storing information for any combination of source and destination. Therefore, no combination of source and destination blocks other combinations of sources and destinations for processing requests based on occupying resources. For example, if a GPU generates many requests found to target the system memory while the CPU of a processing unit generates requests found to target the last-level cache, the fact that the GPU consumes and makes unavailable the resources of the system memory does not prevent the CPU from accessing resources for the last-level cache. The CPU is still capable of obtaining entries in each of the processing table and the retry handling queue. Therefore, the computing system ensures a hit under miss scheme despite the complexity of multiple sources generating requests that begin to make resources unavailable.

When an allotted number of queue entries of the retry handling queue for a combination of a particular source and a particular destination fill up, and the logic of the resource manager determines there are no available resources of the destination targeted by the corresponding request, the logic updates a table entry of a corresponding transaction table. The update indicates that the request is still pending, but has no information stored in either the processing table or the retry handling queue. In an embodiment, a count is incremented. In some designs, a single count is maintained for all sources. In other designs, a count is maintained for multiple of combinations of sources and destinations.

In one embodiment, when the logic of the resource manager determines the count has reached an upper threshold, the logic prevents requests from the corresponding source from being allocated in the processing table. The logic essentially stalls the corresponding source from having requests processed by targeted destinations. When the logic determines the processing table has an available table entry and a request from the corresponding source (or corresponding combination of source and destination) is selected for removal from the retry handling queue, the logic decrements the count. In some designs, when the logic determines the count falls below a lower threshold, the logic permits requests from the corresponding source to be allocated in the processing table. In an embodiment, the logic of the resource manager allocates a queue entry of the retry handling queue with a request from a transaction table that was previously removed from the processing table when the logic determines the subset of queue entries for the corresponding source has an available queue entry.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

Figure 1:
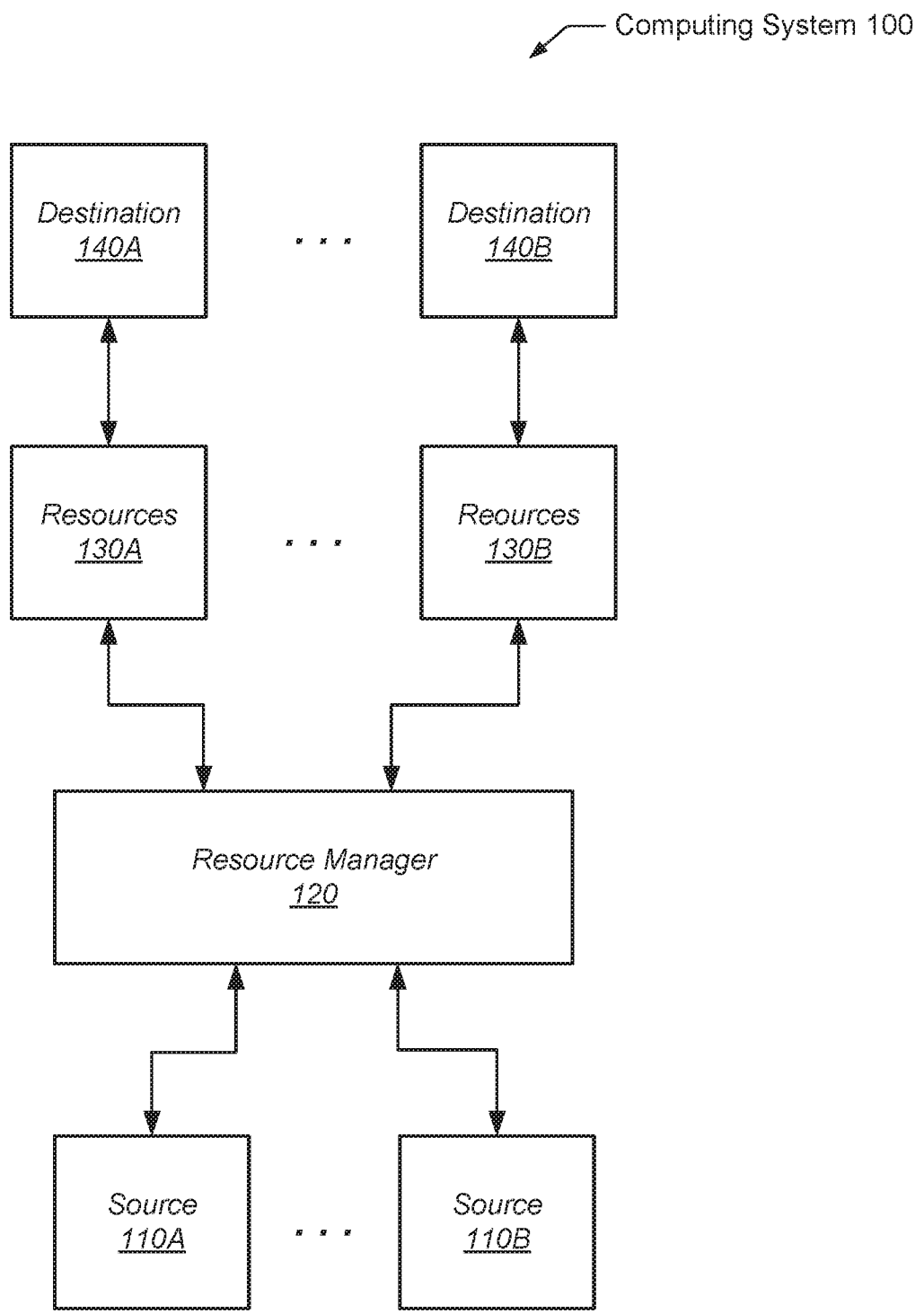
FIG. 1 is a block diagram of one embodiment of a computing system.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Turning now to FIG. 1, a block diagram illustrating one embodiment of a computing system 100 is shown. In various embodiments, the computing system 100 includes multiple sources 110A-110B that generate transactions and send them to the multiple destinations 140A-140B through the resource manager 120. The resources 130A-130B for the destinations 140A-140B include at least data storage elements for storing pending (outstanding) transactions, completed transactions, and payload data. The destinations 140A-140B service the transactions received from the sources 110A-110B. In various embodiments, the computing system 100 is a system on a chip (SoC) that includes multiple types of integrated circuits on a single semiconductor die, each integrated circuit providing a separate functionality. In some embodiments, computing system 100 is also referred to as an application specific integrated circuit (ASIC), or an apparatus. In other embodiments, the sources 110A-110B and destinations 140A-140B are individual dies within a package such as a multi-chip module (MCM). In yet other embodiments, the sources 110A-110B and destinations 140A-140B are individual dies or chips on a printed circuit board.

In an embodiment, the sources 110A-110B include agents such as multimedia engines, digital signal processors (DSPs) and processing units, each with one or more of a central processing unit (CPU) and a data parallel processor like a graphics processing unit (GPU). The destinations 140A-140B include endpoints such as input/output (I/O) peripheral devices such as memory devices, communication interfaces such as radio communication interfaces, speakers, displays and so on. In one embodiment, the destinations 140A-140B include system memory and a last-level cache for the sources 110A-110B. In some embodiments, the sources 110A-110B transfer commands and data between one another and the destinations 140A-140B through a communication fabric (or fabric). In other embodiments, the computing system uses a system bus.

In various embodiments, the computing system 100 includes the resource manager 120, which uses one or more intermediate buffers and tables and logic to interface with the sources 110A-110B and the resources 130A-130B. The resource manager 120 receives transactions from the sources 110A-110B, retrieves data or verifies whether the sources 110A-110B store particular data, and retrieves cache coherency information for particular data. In various embodiments, the resource manager 120 ensures a hit under miss scheme despite the complexity of the multiple sources 110A-110B generating transactions that begin to make the resources 130A-130B unavailable.

In some embodiments, the resource manager 120 allocates entries of data storage elements by maintaining a respective subset of entries being assigned to each of the sources 110A-110B. For example, a first subset of entries is assigned to a CPU, a second subset of entries is assigned to a GPU, and so on. In other embodiments, the subset of entries is assigned to a combination of one of the sources 110A-110B and one of the destinations 140A-140B. For example, a third subset of entries is assigned to the GPU sending memory access transactions targeting system memory, a fourth subset of entries is assigned to the CPU sending memory access transactions targeting a shared last-level cache, and so on. Other categories for assigning subsets of data storage entries are possible and contemplated. The resource manager 120 also supports transaction retry for cases where one of the resources 130A-130B is unavailable and corresponding to one of the destinations 140A-140B targeted by the given transaction.

Figure 2:
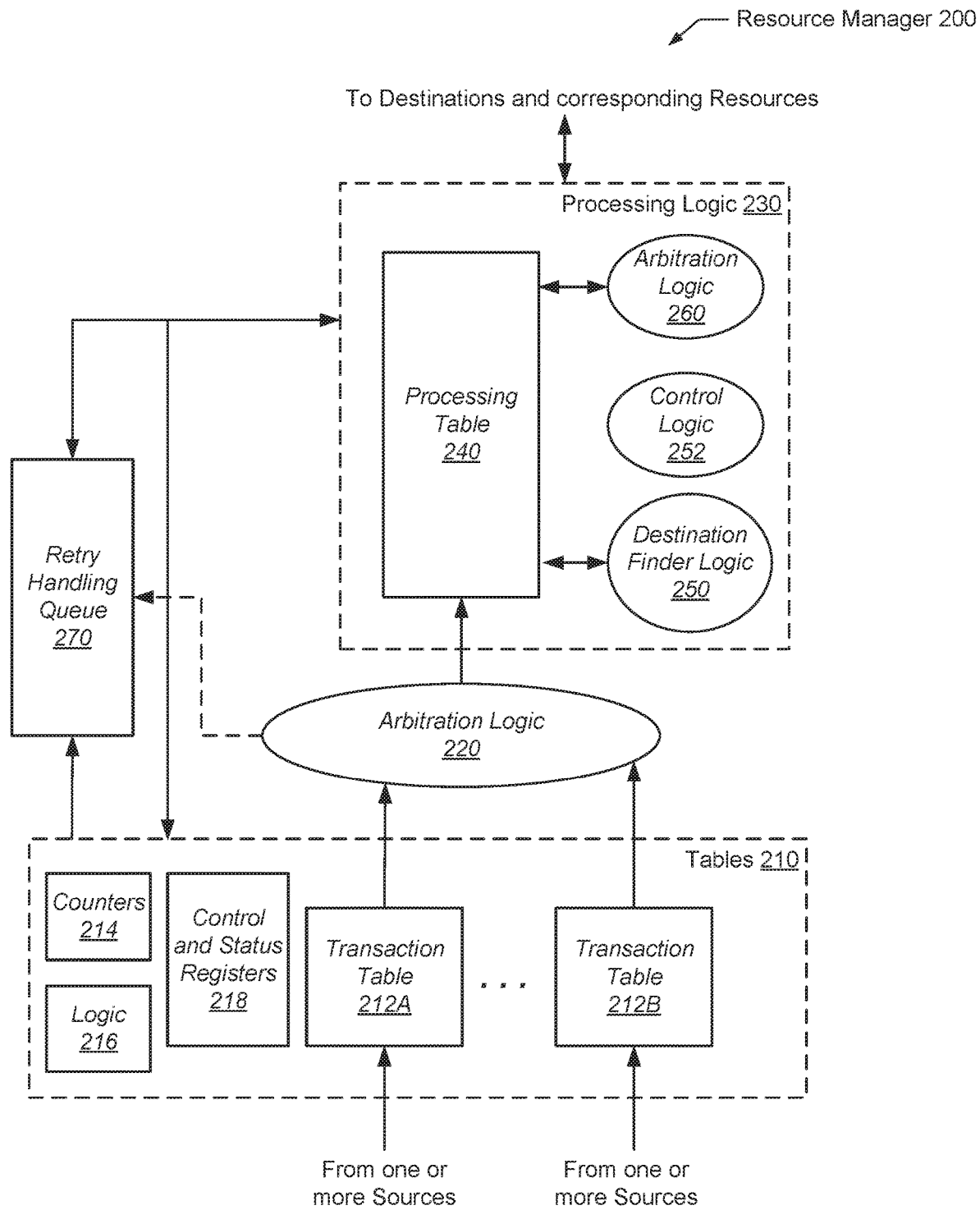
FIG. 2 is a block diagram of one embodiment of a resource manager.

Referring to FIG. 2, a generalized block diagram of one embodiment of a resource manager 200 is shown. As shown, the resource manager 200 includes tables 210 for receiving transactions from one or more sources and storing the received transactions, arbitration logic 220 for selecting transactions stored in tables 210, processing logic 230 for determining a destination for the selected transactions and issuing transactions to multiple destinations and their corresponding resources, and retry handling queue 270 for retrying transactions when resources of a targeted destination are unavailable.

In an embodiment, the tables 210 includes transaction tables 212A-212B for storing transactions received from the multiple sources. In some designs, the resource manager 200 includes one transaction table of the transactions tables 212A-212B for each source. In other designs, a particular transaction table of the transactions tables 212A-212B stores transactions for two or more sources. Logic 216 selects table entries to allocate for storing received transactions and updates table entries. Logic 216 updates the counters 214 when transactions are retried.

The transaction tables 212A-212B store both new transactions and "rollback transactions." New transactions are transactions received from sources, stored in a corresponding one of the transaction tables 212A-212B, and have yet to be selected for processing from the corresponding transaction table. Therefore, in an embodiment, new transactions do not yet have a defined destination. In addition, no checks have yet to be performed for the new transactions for determining availability of resources corresponding to destinations. Rollback transactions are transactions that had been previously selected for processing, had a destination determined, and had a check performed for determining availability of resources of the determined destination. However, rollback transactions were not issued to a corresponding destination due to the resources of the destination being unavailable.

In one embodiment, arbitration logic 220 selects transactions from the transaction tables 212A-212B based on an arbitration value. In various embodiments, the arbitration value is based on one or more factors such as a received priority level, a source identifier, a virtual channel identifier, an indication of an application type such as a real-time application, a command type, an age of the transaction, an amount of data to use for servicing the transaction, an indication of whether the transaction is being retried, and so on. In one example, the arbitration value is a weighted sum of one or more of the previously listed factors with each factor having a respective weight. In an embodiment, the weights are stored in programmable registers of the control and status registers 218.

In some designs, the arbitration logic 220 is built as a hierarchy where first level logic selects a group of one or more transactions from a particular one of the transaction tables 212A-212B, and second level logic selects one or more transactions from the group of the first level. In one embodiment, information of the selected one or more transactions are copied and stored in the processing table 240. Therefore, the table entry of the corresponding one of the transaction tables 212A-212B maintains the information of the pending transaction until logic issues the transaction from the processing table 240 to resources of its destination.

In an embodiment, the processing table 240 stores transactions from multiple sources. Similar to the transaction tables 212A-212B, the processing table 240 is implemented with one of a group of registers, a group of latches, content addressable memory (CAM), static random access memory (SRAM), or other. In an embodiment, the stored transactions do not identify a destination. For example, the transactions are memory access transactions with a target address, and the destination is one of a shared last-level cache and system memory. Each of the source and the memory access transaction is unaware of whether the requested data is located in the shared cache or system memory.

In one embodiment, the destination finder logic 250 (or logic 250) performs a tag lookup of a tag array (not shown) associated with the shared cache using a tag portion of the target address of a given transaction. A match indicates a cache hit, whereas, no matches found indicates a cache miss. For cache hits, the destination of the given transaction is the shared last-level cache. For cache misses, the destination of the given transaction is system memory. In some embodiments, the processing table 240 is actually a pipeline with pipeline registers storing intermediate state information between the pipeline stages. For example, when the processing table 240 determines the destination by using the logic 250 to compare the tag portion of a target address of the transaction with entries of a tag array of the shared last-level cache, the comparison steps and resulting steps are performed across the pipeline stages. In such an embodiment, one or more of the logic 250, the control logic 252 and the arbitration logic 260 is distributed across the pipeline stages. In other embodiments, the processing table 240 is a table with multiple table entries, each updated as transactions are selected and processed.

In some embodiments, the arbitration logic 260 selects a transaction for processing from the processing table 240 based on an arbitration value in a manner as described earlier for arbitration logic 220. In some designs, the arbitration logic 260 includes one or more additional weighted factors such as destinations. For example, in one design, system memory has a higher arbitration weight than the shared last-level cache due to the typically greater latency for servicing transactions sent to system memory. Again, these weights are stored in the control and status registers 218. In another embodiment, separate control and status registers are included with the arbitration logic 260. In other embodiments, the resource manager 200 processes the transactions stored in the processing table 240 in an in-order manner.

Resources for the destinations include data storage elements for storing pending (outstanding) transactions, completed transactions and payload data. When a destination becomes busy, the resources fill up until the resources can no longer receive additional pending transactions. The control logic 252 resource manager 200 determines whether resources at a given destination are unavailable for a given transaction. In some embodiments, the resources assert a flag indicating an unavailable status, maintain a count or a number of credits to indicate availability, and so on.

When arbitration logic 260 selects a given transaction, and control logic 252 determines resources, such as a queue, for the corresponding destination are available, the control logic 252 removes the given transaction from the processing table 240 and sends the given transaction to the resources. At this point, the given transaction is considered processed, although not yet completed. However, in some embodiments, the control logic 252 sends a message to the logic 216 about the given transaction being processed, and in response, the logic 216 removes the given transaction from its corresponding one of the transaction tables 212A-212B. In some embodiments, other tables, queues and logic notify the corresponding source when the given transaction is serviced and/or send a response with response data to the corresponding source. These other components are not shown for ease of illustration.

In contrast to the above, when arbitration logic 260 selects a given transaction, and control logic 252 determines resources, such as a queue, for the corresponding destination are unavailable, the logic 252 removes the given transaction from the processing table 240 and allocates a queue entry in a separate queue such as the retry handling queue 270. Access logic for the retry handling queue 270 is not shown for ease of illustration. In various embodiments, the retry handling queue 270 includes a scoreboard for tracking the resources of destinations.

In some embodiments, one or more of the processing table 240, the retry handling queue 270 and the resources of the destinations has a limited number of available entries less than the total number of entries available for storing information for any combination of source and destination. Therefore, no combination of source and destination blocks other combinations of sources and destinations for processing transactions based on occupying resources. For example, if a GPU generates many requests found to target the system memory while the CPU of a processing unit generates requests found to target the shared last-level cache, the fact that the GPU consumes and makes unavailable the resources of the system memory does not prevent the CPU from accessing resources for the shared last-level cache. The CPU is still capable of obtaining entries in each of the processing table 240 and the retry handling queue 270. Therefore, the resource manager 200 ensures a hit under miss scheme for a computing system despite the complexity of multiple sources generating transactions that make resources unavailable.

When an allotted number of queue entries of the retry handling queue 270 for a combination of a particular source and a particular destination fill up, and the control logic 252 determines there are no available resources of the destination targeted by the given transaction, the control logic 252 notifies the logic 216, and the logic 216 updates a table entry of a corresponding one of the transaction tables 212A-212B. The update indicates that the transaction is still pending, but has no information stored in either of the processing table 240 or the retry handling queue 270. In an embodiment, logic 216 updates a counter of counters 214. In one example, logic 216 increments the counter of counters 216. In some designs, a single count is maintained for all sources. In other designs, a respective count is maintained for multiple of combinations of sources and destinations.

In an embodiment, the logic 216 updates a table entry of a corresponding one of the transaction tables 212A-212B already storing information for the given transaction. The update includes an indication specifying that the control logic 252 attempted to retry the given transaction, but retry resources of the retry handling queue 270 were unavailable. Therefore, the given transaction is still pending, but has no information stored in either of the processing table 240 or the retry handling queue 270. In some designs, the logic 216 updates this table entry to indicate that the given transaction is a rollback transaction.

In some designs, the logic 216 updates the arbitration weight of the given transaction, which is a rollback transaction, stored in this table entry to increase the likelihood of the arbitration logic 220 selecting this table entry over other table entries storing information for new transactions that have not been retried or even sent yet to the processing table 240. In other designs, the indication specifying a rollback transaction already increases the likelihood of arbitration logic 220 selecting the table entry. However, in various embodiments, logic 216 sends rollback transactions to the retry handling queue 270 when retry resources, such as queue entries, are available. In one embodiment, the logic 216 does not send rollback transactions directly to the processing table 240. Rather, in an embodiment, logic 216 sends new transactions to the processing table 240 and sends rollback transactions to the retry handling queue 270. When the control logic 252 determines the processing table 240 has an available table entry, in some embodiments, the control logic 252 prioritizes allocating the available table entry with a transaction from the retry handling queue 270 over a selected transaction from one of the transaction tables 212A-212B.

In one embodiment, when the logic 216 determines a particular count of the counters 214 reaches an upper threshold, the logic 216 prevents new transactions from the corresponding source from being allocated in the processing table 240. The logic 216 essentially stalls the corresponding source from having new transactions processed by targeted destinations. When logic 216 sends a copy of information for a rollback transaction from a corresponding one of the transaction tables 212A-212B to the retry handling queue 270 as queue entries become available in the retry handling queue 270, the logic 216 updates a corresponding one of the counters 214. In some designs, the logic 216 decrements the corresponding one of the counters 214. In some designs, when the logic 216 determines a count of the counters 214 falls below a lower threshold, the logic 216 permits new transactions from the corresponding source to be allocated again in the processing table 240.

It is also noted that the number of components of the resource manager 200 varies from embodiment to embodiment. In other embodiments, there are more or fewer of each component than the number shown for the resource manager 200. It is also noted that each of the types of logic 216, 250, 252 and 260 and additional access logic is implemented by software, hardware such as circuitry, or a combination of hardware and software.

Figure 3:
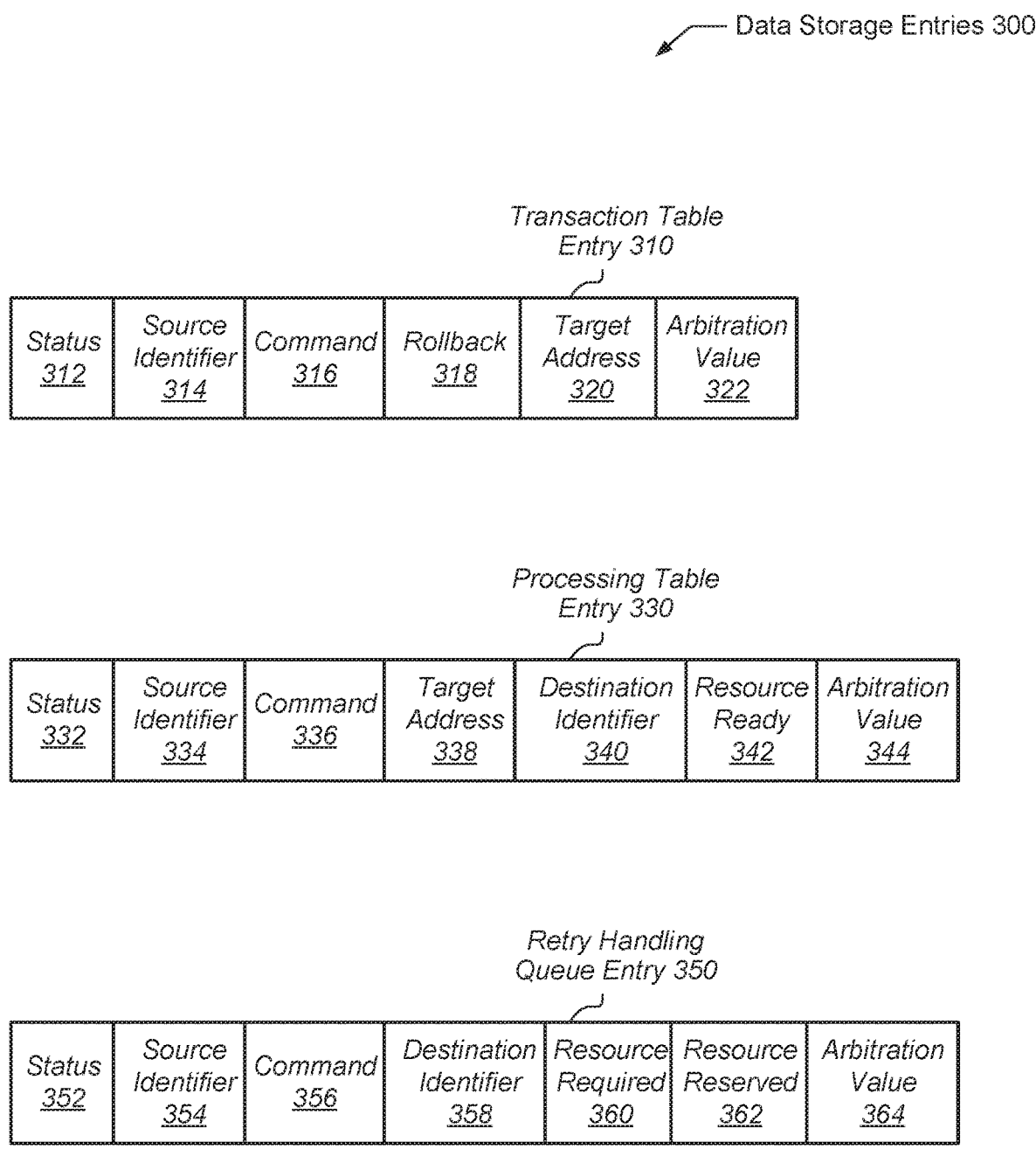
FIG. 3 is a block diagram of one embodiment of data storage entries.

Referring to FIG. 3, a generalized block diagram of one embodiment of a data storage entries 300 is shown. In various embodiments, transaction table entry 310, processing table entry 330 and retry handling queue entry 350 are representative of data storage entries used in the transaction tables 212A-212B, the processing table 240 and the retry handling queue 270 (of FIG. 2). As shown, the transaction table entry 310 (or entry 310) includes fields 312-322. Although the fields 312-322 of entry 310 are shown as being organized in a particular, contiguous manner, in other embodiments, the fields 312-322 are organized in a different order with additional fields between them. Similarly, the fields 332-344 of the processing table entry 330 (or entry 330) and the fields 352-364 of the retry handling queue 350 (or entry 350) are organized differently as shown. In some embodiments, entries 310, 330 and 350 do not use all of the fields shown.

In some embodiments, field 312 of entry 310 includes one or more of a valid bit, an age, a priority level, an entry number, and so forth. Field 314 includes a source identifier (ID) used to identify the source of a corresponding transaction. Field 316 stores an indication specifying a command type such as a write access transaction, a read access transaction, a snoop transaction, and so on. Field 318 stores an indication specifying whether the corresponding transaction is a new transaction or a rollback transaction. Field 320 stores a target address of the transaction. Field 322 stores an arbitration value of the transaction. In some embodiments, external logic generates the arbitration value from one or more values stored in the status field 312 and weights stored in programmable control registers.

In an embodiment, fields 332, 334, 336, 338 and 344 of entry 330 store similar information as fields 312, 314, 316, 320 and 322 of entry 310. Field 340 of entry 330 stores a destination identifier used to identify one of multiple destinations. Field 342 stores an indication of whether resources of the targeted destination are ready. In an embodiment, fields 352, 354, 356, 358 and 364 of entry 350 store similar information as fields 332, 334, 336, 340 and 344 of entry 330. When a transaction is allocated in the retry handling queue, if the corresponding resource is needed and also available, each of the fields 360 and 362 store an asserted value. If the resource is needed and is unavailable, the field 360 stores an asserted value, whereas, the field 362 stores a negated value.

Figure 4:
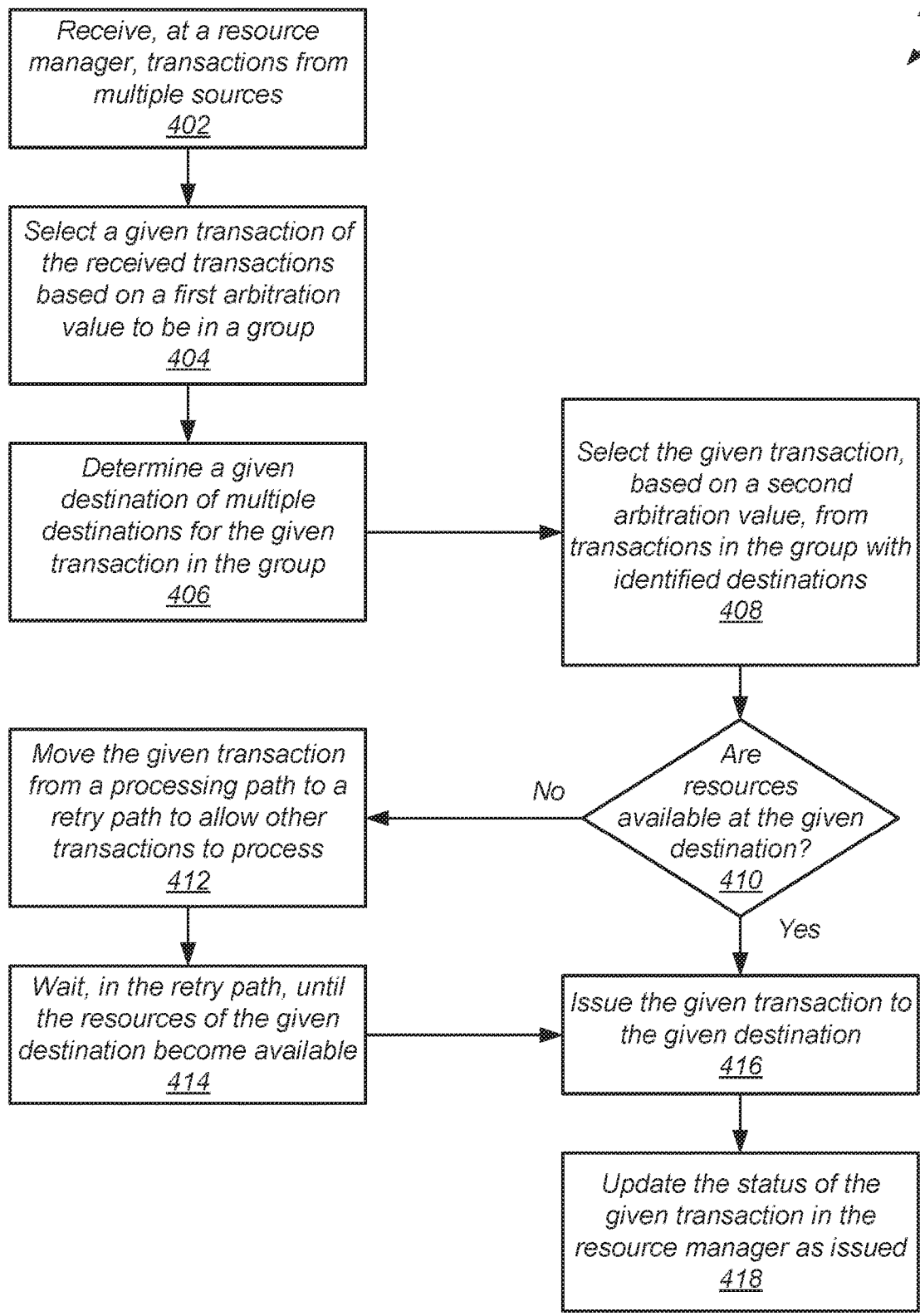
FIG. 4 is a flow diagram of one embodiment of a method for efficiently allocating resources of destinations to sources conveying requests to the destinations.

Turning now to FIG. 4, a generalized flow diagram of one embodiment of a method 400 for efficiently allocating resources of destinations to sources conveying requests to the destinations is shown. For purposes of discussion, the steps in this embodiment (as well as for FIGS. 5-6) are shown in sequential order. However, in other embodiments some steps may occur in a different order than shown, some steps may be performed concurrently, some steps may be combined with other steps, and some steps may be absent.

A resource manager allocates resources of multiple destinations to multiple sources conveying requests to the multiple destinations. In some embodiments, the sources are agents in a SoC generating transactions for destinations in the SoC to service. Examples of the transactions are memory access transactions and snoop transactions. Examples of the destinations are a shared last-level cache, system memory, a last-level cache within a particular agent, and so on. Logic of the resource manager receives transactions from the multiple sources (block 402). In an embodiment, the logic stores a received transaction in one of one or more transaction tables. In one embodiment, the logic of the resource manager selects a given transaction table of multiple transaction tables based at least in part on an identifier specifying the source of the given transaction.

In some designs, the logic of the resource manager selects a given transaction of the received transactions to be in a group based on a first arbitration value (block 404). In one embodiment, information of the selected one or more transactions, which includes the given transaction, are copied and stored in a processing table. The group of selected transactions are stored in the processing table. The table entry of the corresponding one of the transaction tables for the given transaction maintains the information of the pending given transaction until logic issues the given transaction from the processing table to resources of its destination. In various embodiments, the first arbitration value is based on one or more factors such as a received priority level, a source identifier, a virtual channel identifier, an indication of an application type such as a real-time application, a command type, an age of the transaction, an amount of data to use for servicing the transaction, an indication of whether the transaction is being retried, and so on. In one example, the first arbitration value is a weighted sum of one or more of the previously listed factors with each factor having a respective weight. In an embodiment, the weights are stored in programmable configuration registers. In some designs, the arbitration logic is built as a hierarchy where first level logic selects a group of one or more transactions from a particular one of the transaction tables, and second level logic selects one or more transactions from the group of the first level.

In some embodiments, the processing table is actually a pipeline with pipeline registers storing intermediate state information between the pipeline stages. For example, when the processing table determines the destination by comparing a tag portion of a target address of the transaction with entries of a tag array of the shared last-level cache, the comparison steps and resulting steps are performed across the pipeline stages. In other embodiments, the processing table is a table with multiple table entries, each updated as transactions are selected and processed. Similar to the transaction tables, the processing table is implemented with one of a group of registers, a group of latches, content addressable memory (CAM), static random access memory (SRAM), or other. In an embodiment, the given transaction does not identify a destination. For example, the given transaction is a memory access transaction with a target address, but the destination is one of a shared last-level cache and system memory. The memory access transaction is unaware of whether the requested data is located in the shared cache or system memory.

In some embodiments, the logic of the resource manager determines a given destination of multiple destinations for the given transaction stored in the processing table (block 406). For example, in one embodiment, the given transaction is one transaction of one or more transactions selected for further processing. In one embodiment, the logic of the resource manager performs a tag lookup of a tag array associated with the shared cache using a tag portion of the target address of the given transaction. A match indicates a cache hit, whereas, no matches found indicates a cache miss. For cache hits, the destination of the corresponding memory access transaction is the last-level cache. For cache misses, the destination of the corresponding memory access transaction is system memory.

For the given transaction with a destination determined by the logic, the logic selects the given transaction of multiple transactions with identified destinations based on a second arbitration value (block 408). In some embodiments, the second arbitration value is based on multiple factors in a similar manner as the first arbitration value. In an embodiment, the second arbitration value is a weighted sum in a similar manner as the first arbitration value. However, in an embodiment, the second arbitration value also includes the determined destination and a corresponding weight as one of the factors in the list of factors. In some designs, the logic of the resource manager prioritizes selecting transactions that have already been retried compared to transactions that recently had a destination determined. For example, if a transaction has a destination determined, but the resources associated with the destination are unavailable, then the transaction is retried. When the resources become available, the transactions with a status of being retried have higher priority over transactions that have not yet had the resources checked for availability.

If the resources of the destination are unavailable ("no" branch of the conditional block 410), then the logic moves the given transaction from a processing path to a retry path to allow other transactions to process (block 412). In some embodiments, the logic copies and stores the information of the given transaction in a retry handling queue, and deallocates the table entry of the processing table. Therefore, the table entry becomes available for other subsequent transactions. In an embodiment, one or more of the processing table and the retry handling queue has a subset of entries allotted to a particular combination of source and destination. In one example, one or more of the processing table and the retry handling queue has a subset of entries available for transactions from a GPU to system memory. In another example, one or more of the processing table and the retry handling queue has a subset of entries available for transactions from a CPU to the shared last-level cache.

The logic waits, in the retry path, until the resources of the given destination become available (block 414). When the resources of the given destination become available, the logic issues the given transaction to the given destination (block 416). In an embodiment, the logic reinserts a copy of the information of the given transaction in a table entry of the processing table. A portion of the information includes an indication that the given transaction was previously stored in the retry handling queue, and therefore, the arbitration weight of the given transaction increases. The increase of the arbitration weight of the given transaction combined with an indication of the availability of the resources of its destination increases the probability that arbitration logic selects the given transaction for issue to its destination. When the logic issues the transaction to the given destination, the logic also updates the status of the given transaction in the resource manager as issued (block 418). For example, the logic removes information corresponding to the given transaction from one or more of the transaction tables, the processing table and the retry handling queue. If the resources of the destination are available ("yes" branch of the conditional block 410), then control flow of method 400 moves to block 416 where the logic issues the given transaction to the given destination.

Figure 5:
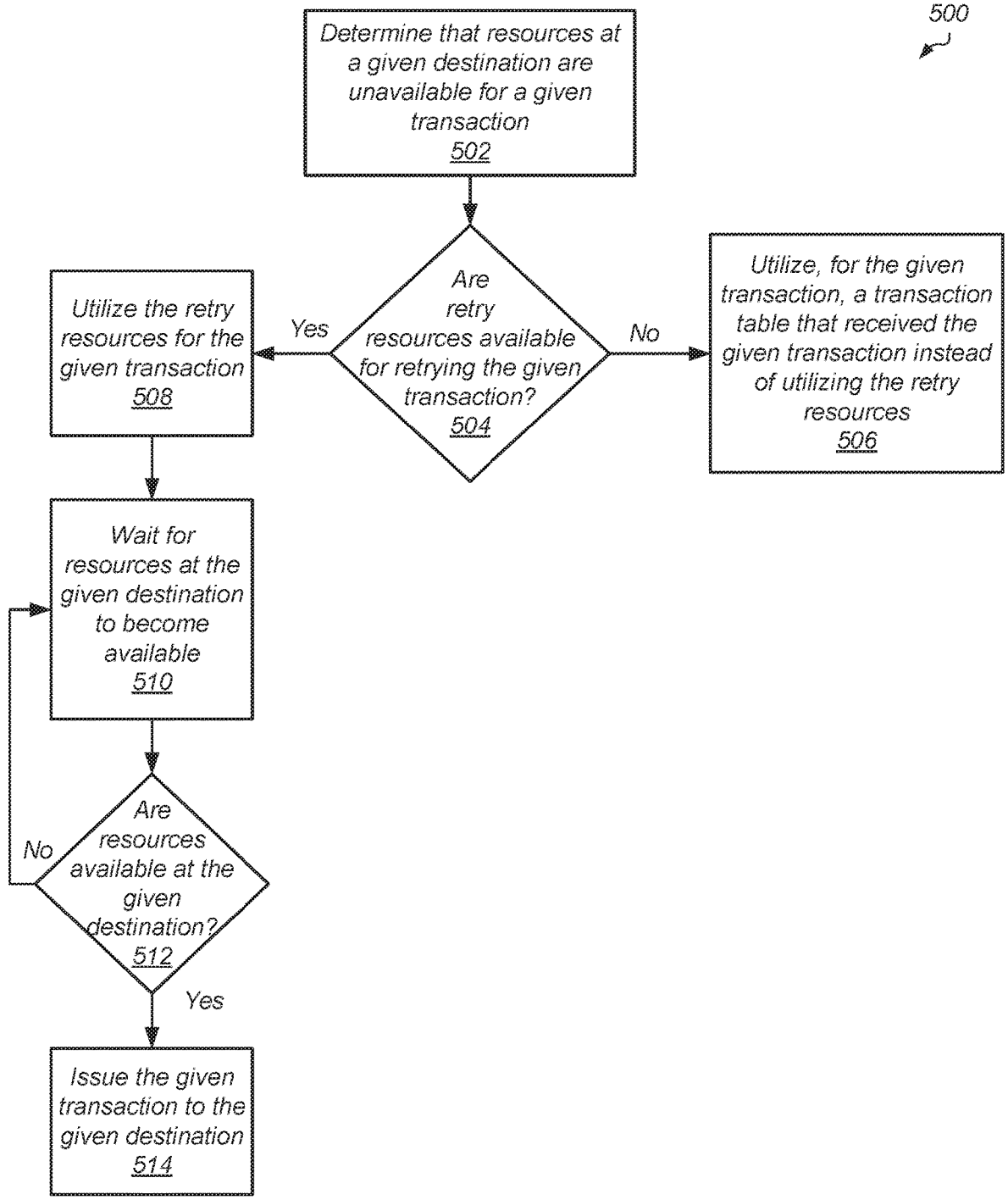
FIG. 5 is a flow diagram of one embodiment of a method for efficiently allocating resources of destinations to sources conveying requests to the destinations.

Turning now to FIG. 5, a generalized flow diagram of one embodiment of a method 500 for efficiently allocating resources of destinations to sources conveying requests to the destinations is shown. As described earlier, in some embodiments, logic of a resource manager determines the destination for a received transaction. Examples of the transactions are memory access transactions and snoop transactions. Examples of the destinations are a shared last-level cache, system memory, a last-level cache within a particular agent, and so on. Resources for the destinations include data storage elements for storing pending (outstanding) transactions, completed transactions and payload data. When the destination becomes busy, the resources fill up until the resources can no longer receive additional pending transactions. The logic of the resource manager determines that resources at a given destination are unavailable for a given transaction (block 502). For example, the resources assert a flag indicating an unavailable status, a count or a number of credits reaches a threshold such as zero or a maximum value, and so on. In some designs, the resources corresponding to destinations have a limited number of available entries less than the total number of entries available for storing information for any combination of source and destination.

In various embodiments, the resource manager includes retry resources such as a retry handling queue. The retry handling queue stores pending transactions removed from the processing table due to unavailable resources at the targeted destination. In some designs, one or more of the processing table, the retry handling queue, and the resources corresponding to destinations has a limited number of available entries less than the total number of entries available for storing information for any combination of source and destination. Therefore, no combination of source and destination blocks based on occupying resources other combinations of sources and destinations for processing transactions. For example, if a GPU generates many requests found to target the system memory while the CPU of a processing unit generates requests found to target the last-level cache, the fact that the GPU consumes and makes unavailable the resources of the system memory does not prevent the CPU from accessing resources for the last-level cache. The CPU is still capable of obtaining entries in each of the processing table and the retry handling queue. Therefore, the computing system ensures a hit under miss scheme despite the complexity of multiple sources generating requests that begin to make resources unavailable.

Similar to the resources of the destination, when retry resources become unavailable, logic for the retry resources assert a flag indicating an unavailable status, a count or a number of credits reaches a threshold such as zero or a maximum value, and so on. If the retry resources are unavailable for retrying the given transaction ("no" branch of the conditional block 504), then the logic of the resource manager utilizes, for the given transaction, a transaction table that earlier received the given transaction instead of utilizing the retry resources (block 506).

In an embodiment, the logic updates the table entry of the transaction table already storing information for the given transaction with an indication specifying that the logic attempted to retry the given transaction, but retry resources were unavailable. Therefore, the given transaction is still pending, but has no information stored in either the processing table or the retry handling queue. In some designs, the logic updates this table entry to indicate that the given transaction is a rollback transaction. Rollback transactions are distinguished from new transactions. In some designs, the logic updates the arbitration weight of this table entry to increase the likelihood of the arbitration logic selecting this table entry over table entries storing information for new transactions.

If the retry resources are available for retrying the given transaction ("yes" branch of the conditional block 504), then the logic of the resource manager utilizes the retry resources for the given transaction (block 508). In some designs, the logic allocates a queue entry for the given transaction within a subset of queue entries assigned to the source of the given transaction. In other designs, the subset of queue entries is assigned to a combination of the source and the determined destination such as a GPU sending a memory access transaction to system memory. Other categories for assigning subsets of queue entries are possible and contemplated. In some designs, the logic of the resource manager decrements a count of entries or a count of credits upon allocating the queue entry.

The logic of the resource manager waits for resources at the given destination to become available (block 510). In some embodiments, the logic monitors a count of available table entries or buffer entries, a count of credits, a particular flag or other for the resources at the destination. If the logic determines that the resources remain unavailable at the given destination ("no" branch of the conditional block 512), then control flow of method 500 returns to block 510. However, if the logic determines that the resources become available at the given destination ("yes" branch of the conditional block 512), then the logic issues the given transaction to the given destination (block 514).

Figure 6:
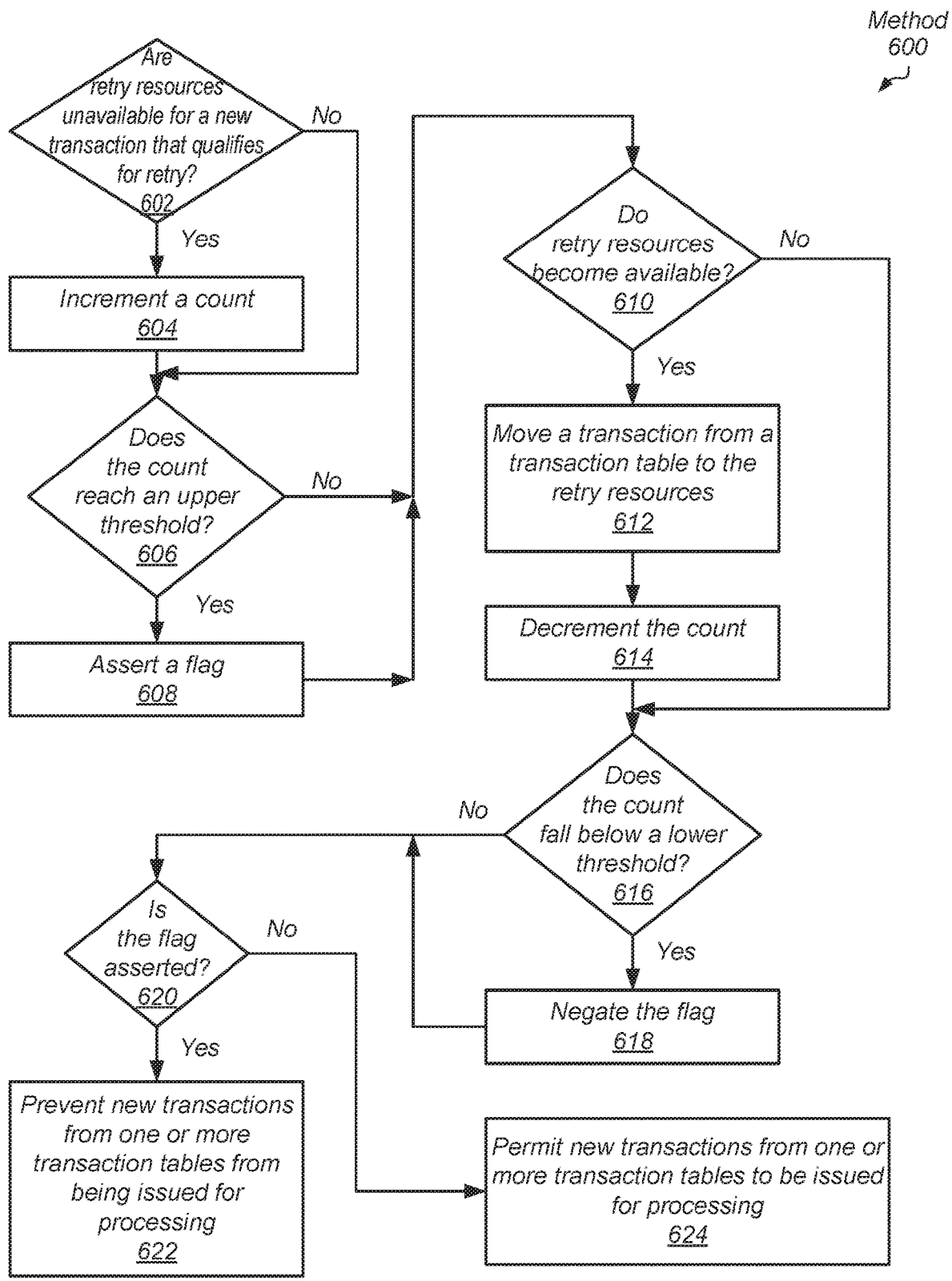
FIG. 6 is a flow diagram of one embodiment of a method for efficiently allocating resources of destinations to sources conveying requests to the destinations.

Turning now to FIG. 6, a generalized flow diagram of one embodiment of a method 600 for efficiently allocating resources of destinations to sources conveying requests to the destinations is shown. As described earlier, resources for the destinations include data storage elements for storing pending (outstanding) transactions, completed transactions, and payload data. When the destination becomes busy, the resources fill up until the resources can no longer receive additional pending transactions. The logic of the resource manager determines when resources at a given destination are unavailable for a given transaction. The retry handling queue stores pending transactions removed from the processing table due to unavailable resources at the targeted destination. In some designs, one or more of the processing table, the retry handling queue, and the resources corresponding to destinations has a limited number of available entries less than the total number of entries available for storing information for any combination of source and destination. Similar to the resources of the destination, when retry resources become unavailable, logic for the retry resources assert a flag indicating an unavailable status, a count or a number of credits reaches a threshold such as zero or a maximum value, and so on.

When the resources of the destination are unavailable for a new transaction, the new transaction qualifies for retry. If the logic of the resource manager then determines that the retry resources are unavailable for the new transaction that qualifies for retry, ("yes" branch of the conditional block 602), the logic increments a count (block 604). In some designs, the new transaction becomes a rollback transaction, and the logic marks this transaction as a rollback transaction in a corresponding table entry of the transaction table storing information for this transaction. In some embodiments, the logic maintains a single count for all sources and destinations. For example, the logic maintains a single count regardless whether the source of the new transaction is a GPU, a CPU, a multimedia engine, and so forth. Additionally, the logic maintains a single count regardless whether the destination of the new transaction is system memory, a shared last-level cache, and so forth.

In other embodiments, the logic maintains multiple counts for multiple sources, for multiple destinations, or for multiple combinations of sources and destinations. For example, in some designs, the logic maintains a first count for the source being the GPU, a second count for the source being the CPU, and so forth. Alternatively, in other designs, the logic maintains a third count for the destination being the system memory, a four count for the destination being the shared last-level cache, and so forth. Although the remainder of the description for method 600 describes a single count, in other embodiments, the logic of the resource manager performs the steps of method 600 for multiple counts.

If the logic determines that the count reaches an upper threshold ("yes" branch of the conditional block 606), then the logic asserts a flag (block 608). As described earlier, in various embodiments, the transaction tables store both new transactions and rollback transactions. In some embodiments, the asserted flag indicates that the logic no longer issues new transactions from the transaction table to processing logic for determining a destination and checking availability of resources of destinations. Rather, the logic only issues rollback transactions from the transaction table to the retry handling queue when resources are available for the retry handling queue. If retry resources become available ("yes" branch of the conditional block 610), then, in some embodiments, the logic moves a rollback transaction from a transaction table to the retry resources (block 612). In an embodiment, the logic maintains the table entry of the transaction table as a valid table entry while copying information of the rollback transaction and storing the information in an allocated queue entry of the retry handling queue. The logic decrements the count (block 614).

If the count falls below a lower threshold ("yes" branch of the conditional block 616), then the logic negates the flag (block 618). If the flag is asserted ("yes" branch of the conditional block 616), then the logic prevents new transactions from one or more transaction tables from being issued for processing (block 622). However, if the flag is negated ("no" branch of the conditional block 616), then the logic permits new transactions from one or more transaction tables from being issued for processing (block 624).

Figure 7:
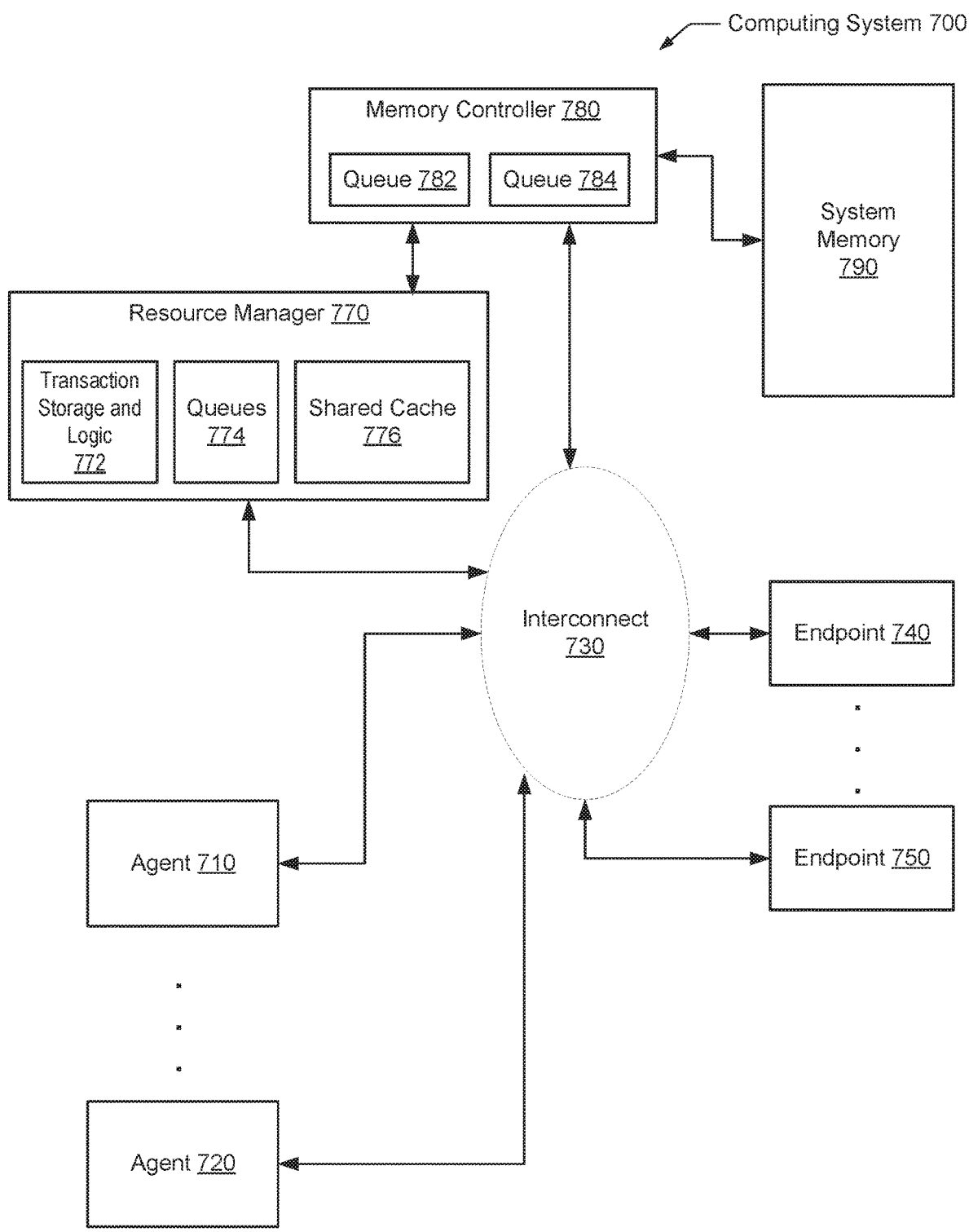
FIG. 7 is a block diagram of one embodiment of a computing system.

Referring to FIG. 7, a generalized block diagram of one embodiment of a computing system 700 is shown. In the illustrated embodiment, interconnect 730 routes commands and data among agents 710-720 and endpoints 740-750. As described earlier, the agents 710-720 are sources capable of generating transactions targeting a destination such as the system memory 790 via the memory controller 780, the shared cache 776, and the endpoints 740-750. In some embodiments, interconnect 730 is a communication fabric (or fabric). In an embodiment, the transaction storage and logic 772 of the resource manager 770 is representative of the data storage and logic of resource manager 200 (of FIG. 2).

In an embodiment, the shared cache 776 is used for storing a most recently used subset of the data stored in the system memory 790. Any cache arrangement is possible and contemplated for the shared cache 776. In some embodiments, the resource manager 770 includes the shared cache 776 and a corresponding cache controller (not shown). The queues 774 represent data storage for storing copies of information corresponding to transactions being issued to the shared cache 776 due to a previous cache hit determination. The queues 774 also store write data for memory write transactions. Therefore, in some embodiments, the queues 774 are located in a corresponding cache controller. The queues 774 are representative of resources for the shared cache 776, which is one of the destinations in the computing system 700.

In other embodiments, the memory controller 780 includes the shared cache 776. In yet other embodiments, circuitry, control logic and data storage elements are distributed between the resource manager and the memory controller 780 in one of a variety of other manners based on design choice. In various embodiments, the computing system 700 is a system on a chip (SoC) that includes multiple types of integrated circuits on a single semiconductor die, each integrated circuit providing a separate functionality. In some embodiments, computing system 700 is also referred to as an application specific integrated circuit (ASIC), or an apparatus. In other embodiments, the agents 710-720 and endpoints 740-750 are individual dies within a package such as a multi-chip module (MCM). In yet other embodiments, the agents 710-720 and endpoints 740-750 are individual dies or chips on a printed circuit board.

Clock sources, such as phase lock loops (PLLs), interrupt controllers, and so forth are not shown in FIG. 7 for ease of illustration. It is also noted that the number of components of the computing system 700 vary from embodiment to embodiment. In other embodiments, there are more or fewer of each component than the number shown for the computing system 700. In an embodiment, each of the agents 710-720 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 772. Any instruction set architecture is implemented in various embodiments.

Each of the agents 710-720 includes one or more processors, each with one or more processor cores. A processor is one or more of a central processing unit (CPU), a data parallel processor like a graphics processing units (GPU), a digital signal processors (DSP), a multimedia engine, and so forth. In some embodiments, components within agent 720 are similar to components in agent 710. In other embodiments, components in agent 720 are designed for lower power consumption, and therefore, include control logic and processing capability producing less performance. In such embodiments, supported clock frequencies are less than supported clock frequencies in agent 710. In addition, one or more of the processor cores in agent 720 include a smaller number of execution pipelines and/or functional blocks for processing relatively high power consuming instructions than what is supported by the processor cores in agent 710.

In various embodiments, agents 710-720 and endpoints 740-750 transfer commands and data to one another and to memory controller 780 through interconnect 730. In some embodiments, interconnect 730 is a communication fabric (or fabric), which includes multiple levels of fabric mulitplexers (or muxes). In such embodiments, agents 710-720 and endpoints 740-750 include fabric interface units. Different types of commands and data flow independently through a communication fabric. In some embodiments, a communication fabric utilizes a single physical fabric bus to include a number of overlaying virtual channels, or dedicated source and destination buffers, each carrying a different type of traffic. Each channel is independently flow controlled with no dependence between transactions in different channels. In other embodiments, the communication fabric is packet-based, and may be hierarchical with bridges, cross bar, point-to-point, or other interconnects.

In various embodiments, interconnect 730 uses one or more bus protocols for transferring commands and data, enforcing an order between transactions with particular transaction types, and ensuring cache coherence among the different agents 710-720 and endpoints 740-750. The supported communication protocols determine allowable transfer sizes, supported burst transfer sizes, supported directions for simultaneous transfers, allowable number of outstanding requests while sending more requests, support of out-of-order completions, supported clock domains, supported interrupt mechanisms, and so forth.

Endpoints 740-750 are representative of any number and type of components coupled to interconnect 730. For example, in some embodiments, endpoints 740-750 include one or more cameras, flash controllers, display controllers, media controllers, graphics units, communication interfaces such as radio communication interfaces, and/or other devices. Endpoints 740-750 are also representative of any number of input/output (I/O) interfaces or devices and provide interfaces to any type of peripheral device implementing any hardware functionality included in computing system 700. For example, in an embodiment, any of the endpoints 740-750 connect to audio peripherals such as microphones, speakers, interfaces to microphones and speakers, audio processors, digital signal processors, mixers, etc. Other I/O devices include interface controllers for various interfaces external to computing system 700, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

In yet other embodiments, one or more of endpoints 740-750 include memory controllers for interfacing with system memory or separate memory such as a portable flash memory device. As shown, memory controller 780 is used to interface with system memory 790. Memory controller 780 includes any number of memory ports, generates proper clocking to memory devices, and interfaces to system memory 790. System memory 790 includes one or more of dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

Figure 8:
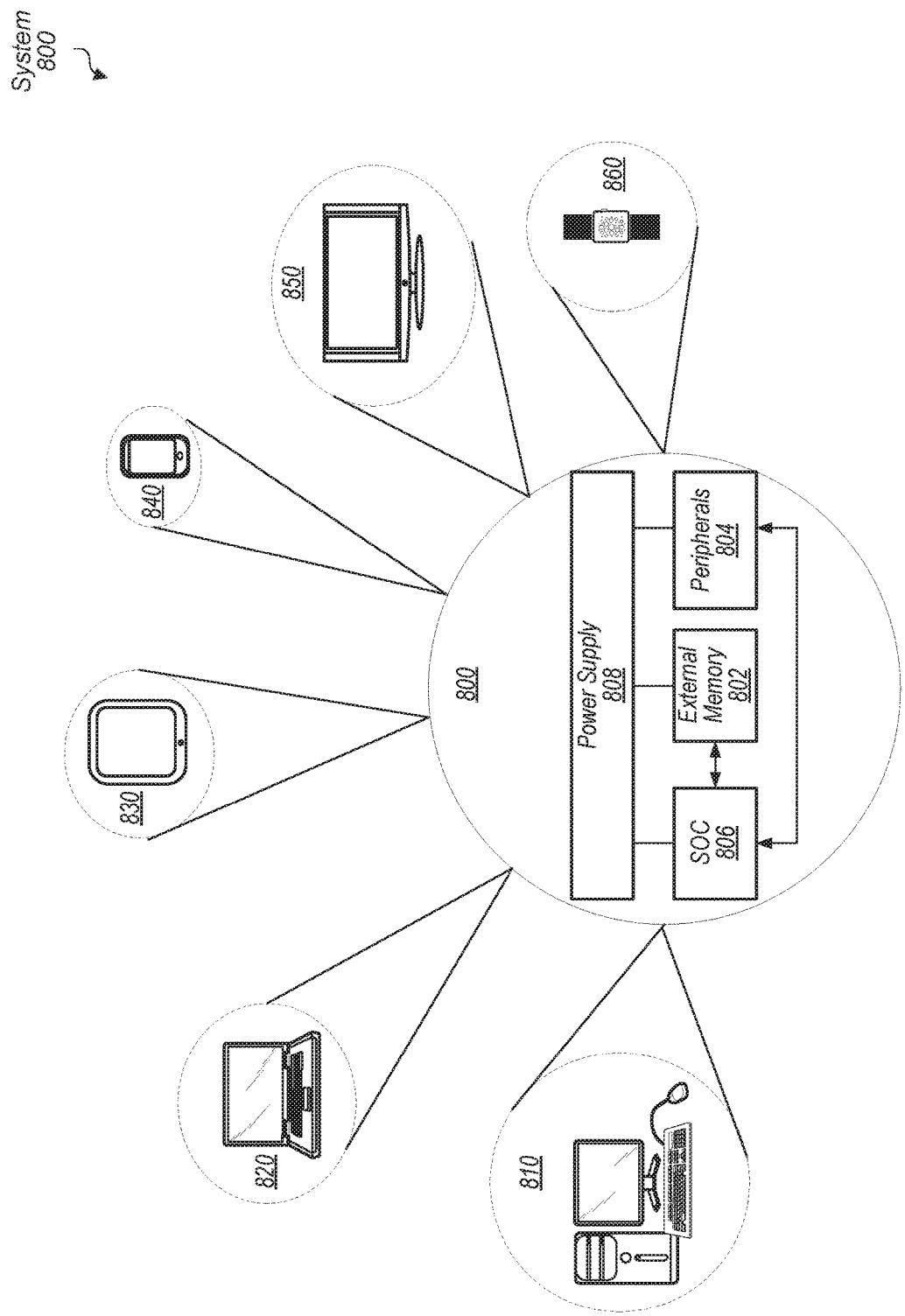
FIG. 8 is a block diagram of one embodiment of a system.

Turning next to FIG. 8, a block diagram of one embodiment of a system 800 is shown. As shown, system 800 represents chip, circuitry, components, etc., of a desktop computer 810, laptop computer 820, tablet computer 830, cell or mobile phone 840, television 850 (or set top box coupled to a television), wrist watch or other wearable item 860, or otherwise. Other devices are possible and are contemplated. In the illustrated embodiment, the system 800 includes at least one instance of a system on chip (SoC) 806 which includes multiple processors and a communication fabric. In some embodiments, SoC 806 includes components similar to resource manager 120 (of FIG. 1), resource manager 200 (of FIG. 2) and resource manager 770 (of FIG. 7) for allocating resources of destinations to sources conveying requests to the destinations. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid-state storage, or disk storage. The peripherals 804 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions describe the behavior of hardware in a high-level programming language, such as C. Alternatively, a hardware design language (HDL) is used, such as Verilog. The program instructions are stored on a non-transitory computer readable storage medium. Numerous types of storage media are available. The storage medium is accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. An apparatus comprising:
 a transaction table comprising a plurality of table entries with one or more entries configured to store a request received from one of a plurality of sources;
 a processing table comprising a plurality of table entries with one or more entries configured to store a request targeting one of a plurality of destinations for servicing the request;
 a retry queue comprising a plurality of queue entries with one or more entries configured to store a request; and
 logic configured to:
  identify an entry in the processing table storing a given request targeting a given destination; and
  based at least in part on a determination that the given destination does not have resources available for servicing the given request:
   allocate the given request in the retry queue; and
   deallocate the given request from the processing table while maintaining a table entry in the transaction table for the given request; and
  based at least in part a determination that the given destination does have resources available for servicing the given request:
   send the given request from the processing table to the given destination; and
   deallocate the given request from each of the processing table and the transaction table.

2. The apparatus as recited in claim 1, wherein one or more of the processing table and the retry queue is organized with a plurality of subsets, each dedicated to requests from a particular source to a particular destination.

3. The apparatus as recited in claim 1, wherein the logic is further configured to determine the given destination for the given request at a point in time when the given request is allocated in the processing table.

4. The apparatus as recited in claim 1, wherein in response to determining resources corresponding to the given destination to use for servicing the given request are not available and the retry queue does not have an available entry for the given request, the logic is further configured to:
 deallocate the given request from the processing table;
 update the given request in the transaction table to indicate that a destination is known while the resources are unavailable; and
 increment a count.

5. The apparatus as recited in claim 4, wherein in response to determining the count has reached an upper threshold, the logic is further configured to prevent requests from one or more of the plurality of sources from being allocated in the processing table.

6. The apparatus as recited in claim 4, wherein in response to determining the processing table has an available table entry and the given request is selected from the retry queue, the logic is further configured to:
 allocate the given request in the processing table;
 deallocate the given request from the retry queue while maintaining the given request in the transaction table; and decrement the count.

7. The apparatus as recited in claim 6, wherein in response to determining the count is below a lower threshold, the logic is further configured to permit requests from the one or more of the plurality of sources to be allocated in the processing table.

8. The apparatus as recited in claim 4, wherein the logic is further configured to allocate a queue entry of the retry queue with the given request from the transaction table responsive to determining:
the plurality of queue entries has an available queue entry; and
the given request was previously deallocated from the processing table due to unavailable resources of the given destination.

9. The apparatus as recited in claim 1, wherein a first destination is system memory and a second destination is a cache, and wherein the logic is further configured to:
determine the system memory is the given destination for the given request based on a tag of the given request does not match any stored tag for the cache; and
determine the cache is the given destination for the given request based on a tag of the given request matches a stored tag for the cache.

10. A method, comprising:
storing, in each of one or more of a plurality of table entries of a transaction table, a request, from one of a plurality of sources,
storing, in each of one or more of a plurality of table entries of a processing table, a request, wherein the request targets one of a plurality of destinations for servicing the request;
storing, in each of one or more of a plurality of queue entries of a retry queue, a request;
in response to determining the given destination does not have resources available for servicing the given request:
allocating, by logic of a resource manager, the given request in the retry queue; and
deallocating, by the logic, the given request from the processing table while maintaining a table entry in the transaction table for the given request; and
in response to determining the given destination does have resources available for servicing the given request:
sending, by the logic, the given request from the processing table to the given destination; and
deallocating, by the logic, the given request from each of the processing table and the transaction table.

11. The method as recited in claim 10, wherein in response to determining resources corresponding to the given destination to use for servicing the given request are not available and the retry queue does not have an available entry for the given request, the method further comprises:
deallocating the given request from the processing table;
updating the given request in the transaction table to indicate that a given destination is known while the resources are unavailable; and
incrementing a count.

12. The method as recited in claim 11, wherein in response to determining the count has reached an upper threshold, the method further comprises preventing requests from one or more of the plurality of sources from being allocated in the processing table.

13. The method as recited in claim 11, wherein in response to determining the processing table has an available table entry and the given request is selected from the retry queue, the method further comprises:
allocating the given request in the processing table;
deallocating the given request from the retry queue while maintaining the given request in the transaction table; and
decrementing the count.

14. The method as recited in claim 13, wherein in response to determining the count falls below a lower threshold, the method further comprises permitting requests from the one or more of the plurality of sources to be allocated in the processing table.

15. The method as recited in claim 11, further comprising allocating a queue entry of the retry queue with the given request from the transaction table responsive to determining:
the plurality of queue entries has an available queue entry; and
the given request was previously deallocated from the processing table due to unavailable resources of the given destination.

16. A non-transitory computer readable storage medium storing program instructions, wherein the program instructions are executable by a processor to:
store, in each of one or more of a plurality of table entries of a transaction table, a request, from one of a plurality of sources,
store, in each of one or more of a plurality of table entries of a processing table, a request, wherein the request targets one of a plurality of destinations for servicing the request;
store, in each of one or more of a plurality of queue entries of a retry queue, a request; and
in response to determining the given destination does not have resources available for servicing the given request:
allocate the given request in the retry queue; and
deallocate the given request from the processing table while maintaining a table entry in the transaction table for the given request; and
in response to determining the given destination does have resources available for servicing the given request:
send the given request from the processing table to the given destination; and
deallocate the given request from each of the processing table and the transaction table.

17. The non-transitory computer readable storage medium as recited in claim 16, wherein in response to determining resources corresponding to the given destination to use for servicing the given request are not available and the retry queue does not have an available entry for the given request, the program instructions are further executable by a processor to:
deallocate the given request from the processing table;
update the given request in the transaction table to indicate that a destination is known while the resources are unavailable; and
increment a count.

18. The non-transitory computer readable storage medium as recited in claim 17, wherein in response to determining the count has reached an upper threshold, the program instructions are further executable by a processor to prevent requests from one or more of the plurality of sources from being allocated in the processing table.

19. The non-transitory computer readable storage medium as recited in claim 17, wherein in response to determining the processing table has an available table entry and the given request is selected from the retry queue, the program instructions are further executable by a processor to:
- allocate the given request in the processing table;
- deallocate the given request from the retry queue while maintaining the given request in the transaction table; and
- decrement the count.

20. The non-transitory computer readable storage medium as recited in claim 19, wherein in response to determining the count falls below a lower threshold, the program instructions are further executable by a processor to permit requests from the one or more of the plurality of sources to be allocated in the processing table.

* * * * *